United States Patent
Chieh et al.

(10) Patent No.: US 11,846,699 B2
(45) Date of Patent: Dec. 19, 2023

(54) METHOD FOR MONOPULSE SINGLE BEAM PHASED ARRAY TRACKING FOR COMMUNICATIONS USING BEAM JITTER

(71) Applicant: The United States of America as represented by the Secretary of the Navy, San Diego, CA (US)

(72) Inventors: Jia-Chi Samuel Chieh, San Diego, CA (US); Everly Yeo, San Diego, CA (US); Max Kerber, San Diego, CA (US); Randall B. Olsen, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 401 days.

(21) Appl. No.: 16/855,002

(22) Filed: Apr. 22, 2020

(65) Prior Publication Data
US 2021/0223380 A1    Jul. 22, 2021

Related U.S. Application Data

(60) Provisional application No. 62/961,847, filed on Jan. 16, 2020.

(51) Int. Cl.
G01S 13/44    (2006.01)
G01S 7/282    (2006.01)
(Continued)

(52) U.S. Cl.
CPC .......... *G01S 13/4463* (2013.01); *G01S 7/282* (2013.01); *G01S 7/2925* (2013.01); *G01S 7/32* (2013.01); *G01S 13/426* (2013.01); *H01Q 25/02* (2013.01)

(58) Field of Classification Search
CPC .... G01S 13/4463; G01S 7/282; G01S 7/2925; G01S 7/32; G01S 13/426; G01S 13/4454;
(Continued)

(56) References Cited

U.S. PATENT DOCUMENTS 4,768,034 A  *  8/1988  Preikschat ............ G01S 13/726
                                                           342/80
6,771,218 B1 *  8/2004  Lalezari ................... H01Q 1/28
                                                          342/373
(Continued)

FOREIGN PATENT DOCUMENTS

CN           109921197 A   *   6/2019

OTHER PUBLICATIONS

CN_109921197_A_I_translate_PE2E.pdf—translate of CN109921197 (Year: 2019).*

*Primary Examiner* — Vladimir Magloire
*Assistant Examiner* — Yonghong Li
(74) *Attorney, Agent, or Firm* — Naval Information Warfare Center, 1_Pacific; Kyle Eppele; Paul C. Oestreich

(57) ABSTRACT

A need exists for a method to do monopulse tracking with a single beam phased array antenna. With a monopulse tracker antenna, the satellite, or moving target, will have a beacon signal that the tracker can acquire. The beacon signal may be a preamble in the transmitted signal from the satellite. The monopulse tracker antennas are scanned over the volume, minimizing the error signal. When the error signal is minimal, the antenna is pointed in the direction of the satellite or moving target. Because the tracker needs to know direction offsets in both azimuth and elevation planes, error signals from both planes are needed. The monopulse tracker antenna maintains a radio frequency link to the beacon signal, causing the antenna to lock in the direction of the satellite when the error signal is minimized to zero.

21 Claims, 3 Drawing Sheets

(51) Int. Cl.
  *H01Q 25/02* (2006.01)
  *G01S 3/42* (2006.01)
  *G01S 7/32* (2006.01)
  *G01S 7/292* (2006.01)
  *G01S 13/42* (2006.01)

(58) Field of Classification Search
  CPC ........ G01S 13/72; G01S 13/781; G01S 13/88; G01S 2013/0245; H01Q 25/02
  See application file for complete search history.

(56) References Cited

U.S. PATENT DOCUMENTS

| 2003/0020646 | A1* | 1/2003 | Yu ...................... G01S 13/4409 |
| | | | 342/149 |
| 2018/0259641 | A1* | 9/2018 | Vacanti ................ G01S 13/953 |
| 2019/0331800 | A1* | 10/2019 | Espeland ................ G01S 3/38 |

\* cited by examiner

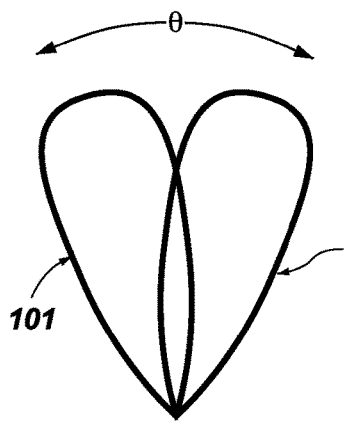
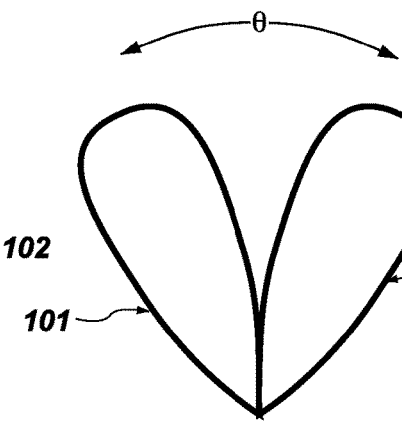
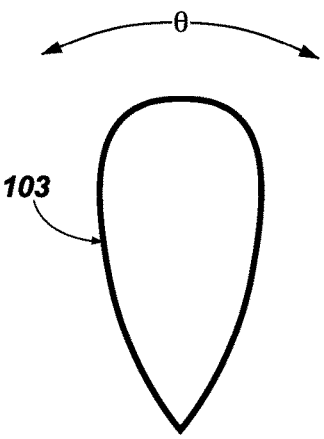
Overlapping Antenna Patterns
FIG. 1A
Difference Pattern Δ
FIG. 1B
Summation Pattern Σ
FIG. 1C
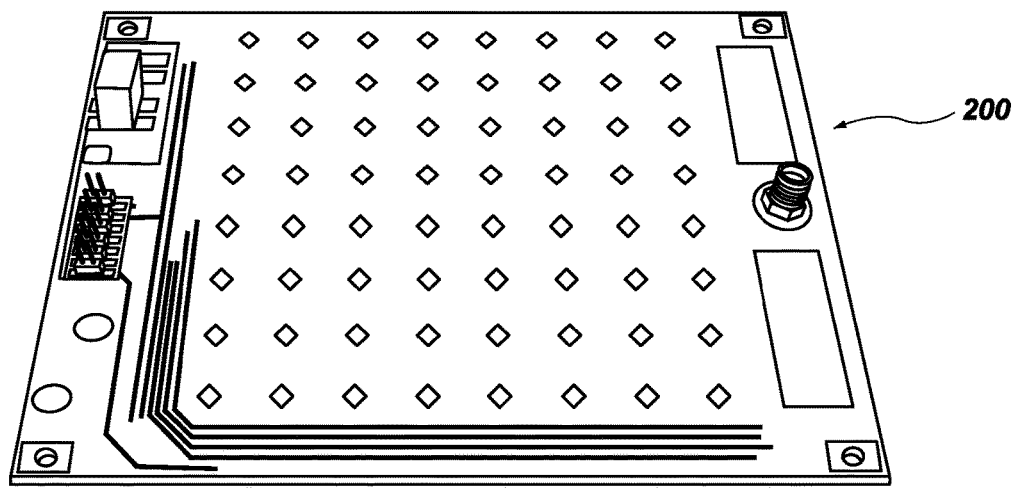
FIG. 2

METHOD FOR MONOPULSE SINGLE BEAM PHASED ARRAY TRACKING FOR COMMUNICATIONS USING BEAM JITTER

CROSS-REFERENCE TO RELATED APPLICATIONS

This application is a nonprovisional application claiming priority to U.S. Patent Application Ser. No. 62/961,847, filed on Jan. 16, 2020, entitled "Method for Monopulse Single Beam Phased Array Tracking for Communications Using Beam Jitter," the entire content of which is fully incorporated by reference herein.

FEDERALLY-SPONSORED RESEARCH AND DEVELOPMENT

The Method for Monopulse Single Beam Phased Array Tracking for Communications Using Beam Jitter is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email NIWC_Pacific_T2@navy.mil Reference Navy Case Number 108686.

BACKGROUND

Ground terminals for satellite communications (SATCOM) generally require the ground terminal to track the location of the satellite, so the antenna is aligned for maximum signal reception and transmission. The most ubiquitous SATCOM antenna is a small parabolic dish. In order to track the satellite in orbit, monopulse tracking is occasionally employed. In a typical reflector (dish) solution, in order to realize the monopulse tracker, the feed to the reflector requires a plurality of feed ports.

The commercial SATCOM sector is moving away from GEO (55,000 km) synchronous orbit, to LEO orbit (1,400 km) because the distance is closer, so latency is reduced, as well as power requirements and reduced antenna size on both the sky and ground terminals. Because the distance is closer, the LEO orbit is faster than the GEO orbit, which means the satellite is overhead for a shorter time. The ground antenna terminals need to be able to point the beam quickly to track the satellite overhead, as well as quickly make the handoff to the next satellite. Phased array antennas, or electronically steered antennas, are preferred. They can slew much faster than a mechanically steered antenna. However, electronically steered antenna arrays need a method for tracking. A need exists for a method to do monopulse tracking with a single beam phased array antenna.

BRIEF DESCRIPTION OF THE DRAWINGS

FIGS. 1A-1C show various monopulse antenna patterns.

FIG. 2 shows an embodiment of a prototype phase array in accordance with the Method for Monopulse Single Beam Phased Array Tracking for Communications Using Beam Jitter.

DETAILED DESCRIPTION OF SOME EMBODIMENTS

Figure 3:
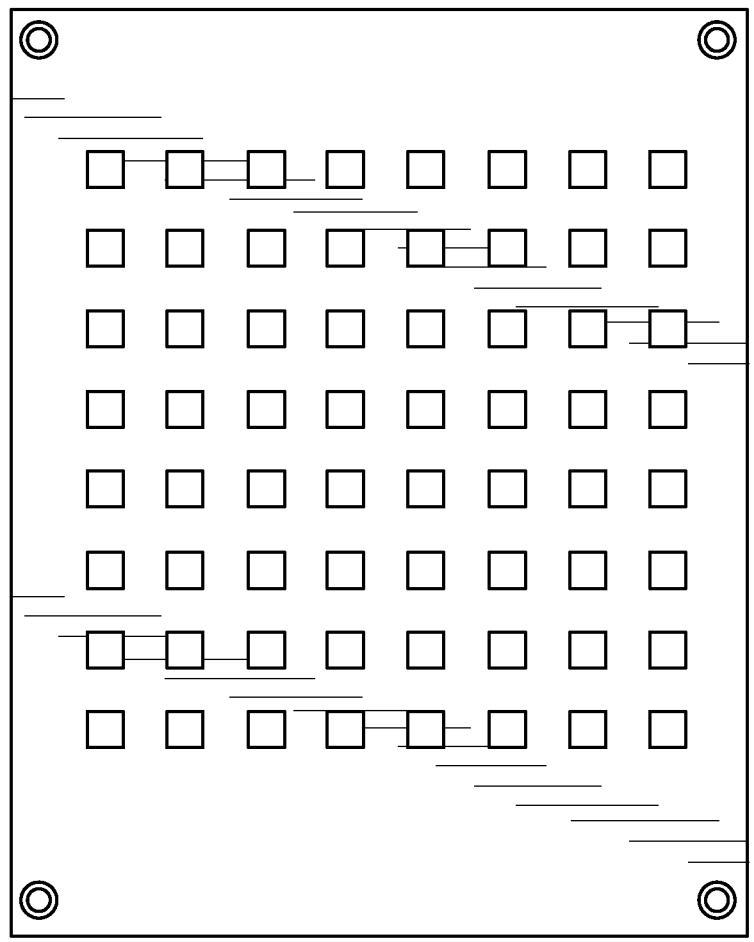
FIG. 3 shows an alternate embodiment of a prototype phased array in accordance with the Method for Monopulse Single Beam Phased Array Tracking for Communications Using Beam Jitter.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

A satellite-tracking system may employ a monopulse tracker antenna rather than using mechanically steered antennas. FIGS. 1A-1C show various monopulse tracker antenna patterns. FIG. 1A shows overlapping antenna patterns with lobes 101 and 102. With a monopulse tracker, a summation beam and a difference beam are generated. FIG. 1B shows a difference pattern with symmetric lobes 101 and 102. The difference pattern has a null in the boresight direction, with symmetric lobes 101 and 102 on either side of boresight.

FIG. 1C shows a single summation pattern with lobe 103. The summation signal has all of the power in the boresight direction. The angle of lobes 101 and 102 can differ from system to system. The two patterns (summation FIG. 1C and difference FIG. 1B) are compared using the amplitude of the signal, and that generates an error signal.

With a monopulse tracker antenna, the satellite, or moving target, will have a beacon signal that the tracker can acquire. The beacon signal may be a preamble in the transmitted signal from the satellite. The monopulse tracker antennas are scanned over the volume, minimizing the error signal. When the error signal is minimal, the antenna is pointed in the direction of the satellite or moving target. Because the tracker needs to know direction offsets in both azimuth and elevation planes, error signals from both planes are needed. The monopulse tracker antenna maintains a radio frequency link to the beacon signal, causing the antenna to lock in the direction of the satellite when the error signal is minimized to zero.

FIG. 2 shows an example of a prototype phase array 200. Prototype phase array 200 is a Ku-Band 64-element Transmit Receive Phased Array that uses the Anokiwave AWMF-0117 silicon beamformer chipset. In one embodiment, prototype phase array 200 has 6-bits of phase control and 6-bits of amplitude control, which are used to create the summation and difference Beams.

Electronically steered antenna arrays offer very fast beam steering, on the order of microseconds. Array 200 is a single beam phased array using printed circuit board technology and multiple COTS silicon chipsets. Because the amplitude and phase of each of the 64 elements can be programmed, various amplitude and phase tapers can be applied across array 200. These phase tapers allow for creating the summation and difference beams synthetically. The most common summation beam pattern is using a Taylor weighting/distribution. This weighting suppresses sidelobes and puts all of the energy into the main beam. This is useful for the summation beam pattern. The most common difference pattern synthesis method is to use the Bayliss amplitude distribution. This type of amplitude distribution creates a null in the boresight direction, with two symmetric main lobes on either side of the null.

FIG. 3 shows an embodiment of a transmit and receive phased array aperture.

Figure 4:
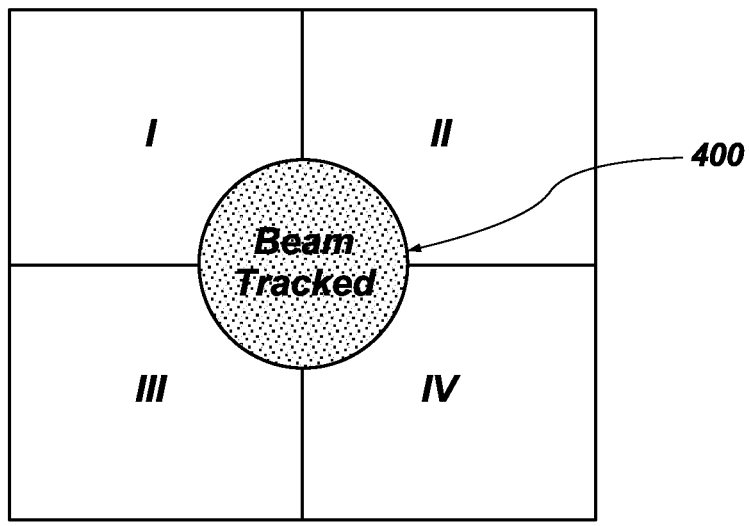
FIG. 4 shows a method for coarse acquisition in accordance with the Method for Monopulse Single Beam Phased Array Tracking for Communications Using Beam Jitter.
Figure 5:
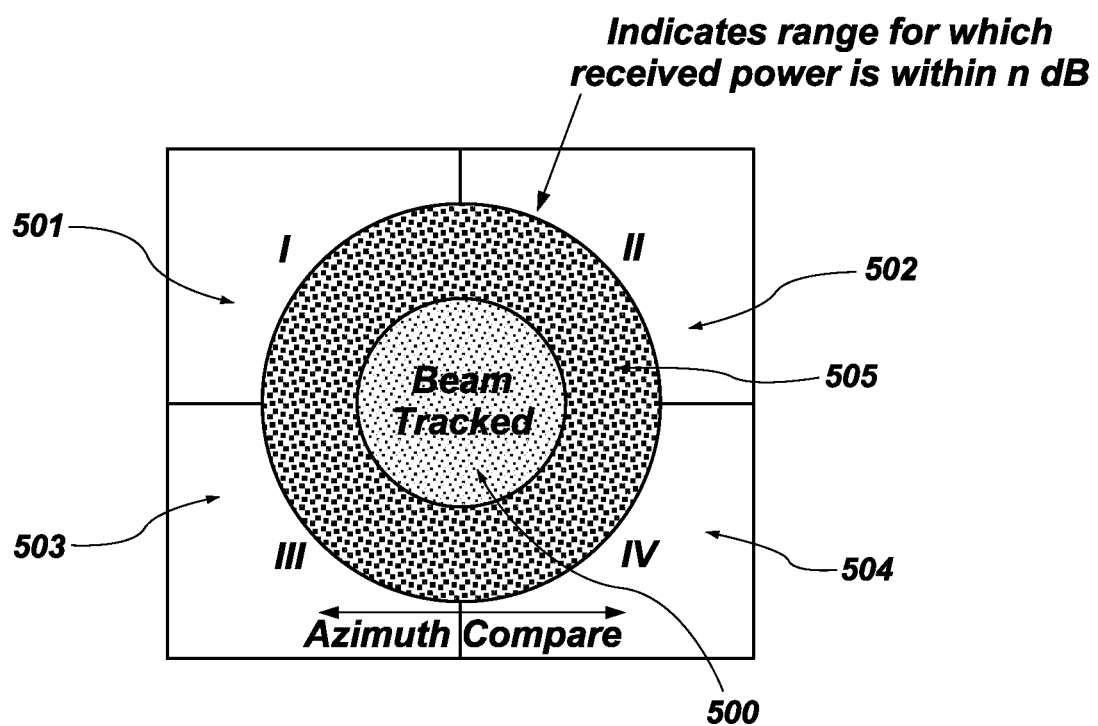
FIG. 5 shows a method for fine acquisition in accordance with the Method for Monopulse Single Beam Phased Array Tracking for Communications Using Beam Jitter.

FIGS. 4 and 5 show two methods for monopulse tracking using the summation and difference patterns. FIG. 4 shows a method for coarse acquisition. For coarse acquisition, a beam 400 is scanned using up/down raster or conical scan for coarse acquisition. Once general beam direction is known, coarse acquisition is acquired. Beam 400 represents the beam width of the main lobe of an antenna.

FIG. 5 shows a method for fine acquisition. FIG. 5 shows beam 500 and four quadrants identified for Azimuth and Elevation comparison: quadrants 501, 502, 503, and 504. Since the beamwidth of the antenna (not shown) is known, an acceptable deviation angle is identified for which beam 500 can stray within an N dB limit. N dB is defined as whatever loss is acceptable without losing the link (acceptable BER). For example, N dB could be 3-6 dB. The main beam can stray within this acceptable deviation angle and not lose link, but with slightly degraded SNR. The actual circumference is known because the beamwidth of the antenna array is also known. Because beam 500 is able to stray within this circumference, beam 500 resides within each of the four quadrants 501-504. Shaded area 505 represents the circumference around beam 500 for which the loss is less than N dB.

A phased array such as shown in FIG. 2 or 3 can electronically synthesize beams quickly. For an 8×8 array, a unique beam pattern/position can be generated every 20 microsecond. The summation beam could be Taylor weighted to provide minimum sidelobes, or a uniform distribution could alternatively be used. The summation beam only requires that energy be directed in the main beam. The summation beam is jittered randomly within the N dB circumference 505 as shown in FIG. 5. This way the communications link will not be lost, but rather allows the summation beam to traverse within each of the four quadrants 501-504.

Depending on the communications signal that is being used, a signal may have some timing slop in terms of how it maintains the link. The difference beam is then activated at the same position as the summation beam to operate within the timing slop, so that the link is not lost. Since summation and difference beams are now known, and traverse in each of quadrants 501-504, an error signal can be determined. Once the error signal is known, then position corrections can be made in order to keep tracking the moving target. The main benefit is that since the beam can be switched quickly electronically (around 20 microsecond), two beams (summation and difference) can be synthesized in each of the four quadrants 501-504, from a single antenna aperture.

This method enables monopulse tracking without the need for five distinct antennas. Typical implementations require two antennas in the elevation plane, two antennas in the azimuth, and a single main communications antenna. With phased arrays, beams can be synthesized in under 100 microsecond, so the method described herein is to synthetically create the four monopulse antennas by straying the beam and by using amplitude distributions to create the summation and difference patterns. A user can assume that occasional 100 microsecond discontinuity in the signal will not break the communications link and that the link has some timing slop built in.

In another alternative embodiment, the beam, instead of being jittered, could have a pre-arranged traversal pattern, such that each of the four quadrants 501-504 are visited equally.

In an alternative embodiment, two arrays could be used if discontinuity in the switching/synthesis of the monopulse beams are too large. One array would be dedicated to the monopulse tracking, and could generate both summation and difference beams, and move between the four quadrants. The second array would be dedicated to the communications links. This might also be used if the beacon signal is at a different frequency than the carrier or if the carrier signal strength is too low for monopulse tracking. The beams can be synthesized using radio frequency or analog phase shifters or in the digital domain using digital beam forming.

Many modifications and variations of the Method for Monopulse Single Beam Phased Array Tracking for Communications Using Beam Jitter are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method for monopulse tracking comprising:
   using an electronically-steered phased array antenna to generate a single beam, the single beam configured to connect to a beacon signal, wherein the beacon signal is coupled to a satellite;
   using the single beam to track the satellite as the satellite moves, creating a summation beam and a difference;
   exclusively switching between the summation beam and the difference beam within a timing stop, thereby creating a summation pattern and a difference pattern;
   comparing the summation pattern and the difference pattern to generate an error signal;
   minimizing the error signal to zero, causing the electronically-steered phased array antenna to lock in a direction of the satellite; and
   using the summation pattern and difference pattern for monopulse tracking using coarse acquisition, wherein the single beam is scanned using an up, down, and conical motion to determine general beam direction.

2. The method of claim 1, wherein the electronically-steered phased array antenna further comprises 64 elements, wherein each element has a specific amplitude and phase, and wherein the electronically-steered phased array antenna is operating in Ku-Band between 11-13 Ghz.

3. The method of claim 2, further comprising:
programming the amplitude and phase of each of the elements;
applying various amplitude and phase tapers across the electronically-steered phased array antenna; and
using the phase tapers to create the summation and difference beam patterns synthetically.

4. The method of claim 3, further comprising:
generating a unique beam pattern every 20 microseconds.

5. The method of claim 1, further comprising:
using the summation pattern and the difference pattern for monopulse tracking using fine acquisition wherein four quadrants are identified around the single beam for azimuth and elevation comparison;
identifying an acceptable deviation angle for which the single beam can stray within an N dB limit;
jittering the summation beam randomly within the N dB acceptable deviation angle, allowing the summation beam to traverse within each of the four quadrants;
activating the difference beam at a same position as the summation beam;
determining an error signal; and
making position corrections to allow for continued tracking of the satellite.

6. The method of claim 5, further comprising:
providing the summation beam with a pre-arranged traversal pattern, such that each of the four quadrants are visited equally.

7. The method of claim 1, further comprising:
using a first and second electronically-steered phased array antenna array, wherein the first array is configured to perform monopulse tracking, and the second array is configured to act as a communication link.

8. The method for monopulse tracking of claim 1, wherein the difference beam further comprises an azimuth difference beam and an elevation difference beam.

9. The method for monopulse tracking of claim 1, wherein the summation beam is Taylor weighted.

10. The method for monopulse tracking of claim 1, wherein the difference beam is Bayliss weighted.

11. A system for monopulse tracking comprising:
an electronically-steered phased array antenna having a plurality of antenna elements, each element configured to synthesize a summation beam pattern and a difference beam pattern, serially and not simultaneously, from a single beam within a timing slop, the summation beam pattern and the difference beam pattern configured to generate an error signal;
the electronically-steered phased array antenna configured to minimize the error signal to zero, causing the electronically-steered phased array antenna to lock in place; and
wherein the single beam is scanned using an up, down, and conical motion to determine general beam direction.

12. The system of claim 11, wherein four quadrants are identified around the single beam for azimuth and elevation comparison, an acceptable deviation angle is identified for which the single beam can stray within an N dB limit, the summation beam is jittered randomly within the N dB acceptable deviation angle, the summation beam is allowed to traverse within each of the four quadrants; the difference beam is activated at a same position as the summation beam, an error signal is determined and position corrections are made to allow for continued tracking.

13. The system of claim 12, wherein the single beam is configured to maintain a radio frequency link to a beacon signal, and wherein the beacon signal is coupled to a satellite, causing the electronically-steered phased array antenna to lock in a direction of the satellite when the error signal is minimized to zero.

14. The system of claim 13, wherein the electronically-steered phased array antenna has 64 elements, wherein each element has a specific amplitude and phase, and wherein the electronically-steered phased array antenna is operated in Ku-Band between 11-13 Ghz.

15. The system of claim 14, wherein each element is programmed to have a specific amplitude and phase applied across the electronically-steered phased array antenna, the amplitude and phase used to create the summation and difference beam patterns synthetically.

16. The system of claim 11, wherein the single beam is synthesized using radio frequency.

17. The system of claim 11, wherein the single beam is synthesized in a digital domain using digital beam forming.

18. The system of claim 11, wherein the single beam is synthesized using analog phase shifters.

19. The system for monopulse tracking of claim 11, wherein the difference beam further comprises an azimuth difference beam and an elevation difference beam.

20. The system for monopulse tracking of claim 11, wherein the summation beam is synthesized using Taylor weighting.

21. The system for monopulse tracking of claim 11, wherein the difference beam is synthesized using Bayliss weighting.

* * * * *